United States Patent [19]

Kraus

[11] 4,262,764
[45] Apr. 21, 1981

[54] CONVERTIBLE CHASSIS FOR TRACK LAYING VEHICLES

[75] Inventor: Peter B. Kraus, Lake Oswego, Oreg.

[73] Assignee: De Lorean Manufacturing Company, Bloomfield Hills, Mich.

[21] Appl. No.: 87,019

[22] Filed: Oct. 22, 1979

[51] Int. Cl.³ .................. B62D 55/12; B62D 55/16
[52] U.S. Cl. .................. 180/9.48; 180/9.58; 180/9.62; 305/27
[58] Field of Search .................. 180/9.48, 9.2, 9.26, 180/9.58, 9.62, 209; 301/36 R; 305/21, 27, 29

[56] References Cited

U.S. PATENT DOCUMENTS

| 1,665,470 | 4/1928 | Norelius | 180/9.62 |
| 1,817,809 | 8/1931 | Eilersgaard | 180/9.48 |
| 3,606,496 | 9/1971 | Haycock | 180/9.58 |

FOREIGN PATENT DOCUMENTS 402297 11/1933 United Kingdom .................. 180/9.58

Primary Examiner—John P. Silverstrim
Assistant Examiner—Donn McGiehan
Attorney, Agent, or Firm—A. Ray Osburn

[57] ABSTRACT

For a track laying vehicle, a convertible chassis comprising endless track driving sprocket wheels and track guide bogie wheel assemblies, both mountable upon the vehicle to accommodate wide or narrow endless tracks selectably, the sprocket wheels being reversibly mountable upon the sprocket drive shafts of the vehicle using flanges axially offset from the track engaging teeth of the sprocket wheel, and the bogie assemblies being mountable at selectable locations upon elongated crossmembers secured to the frame of the vehicle.

4 Claims, 5 Drawing Figures

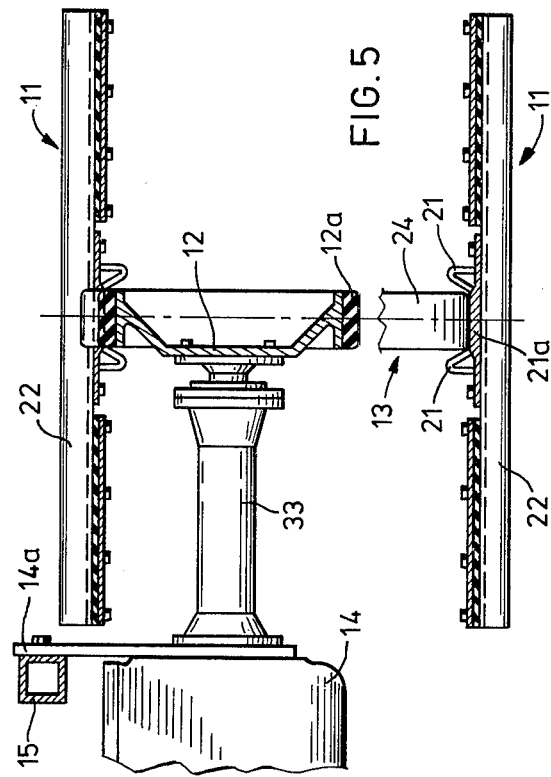
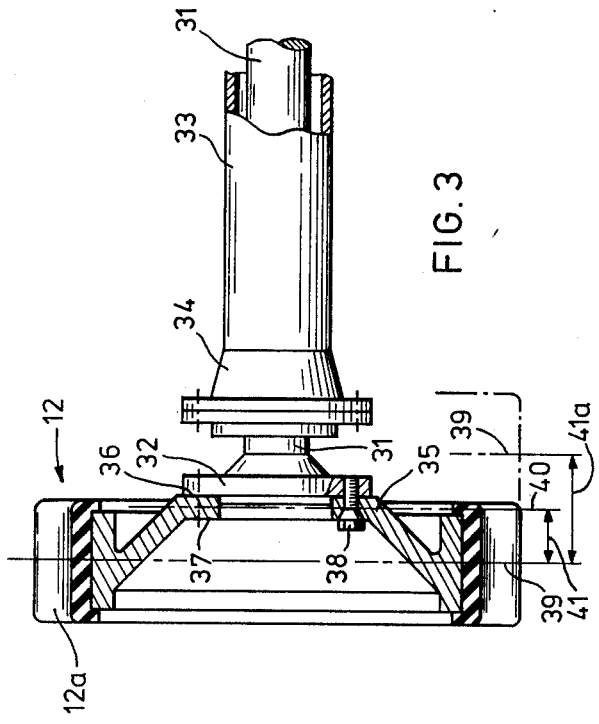
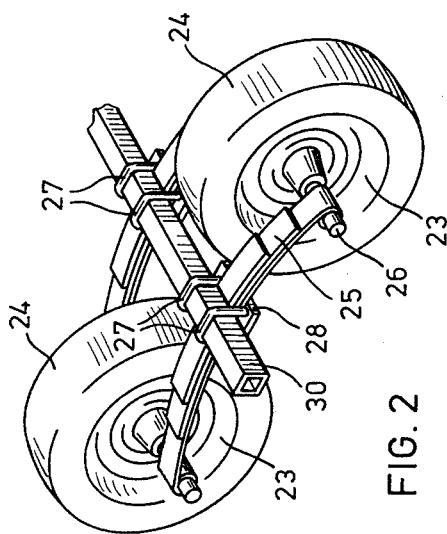
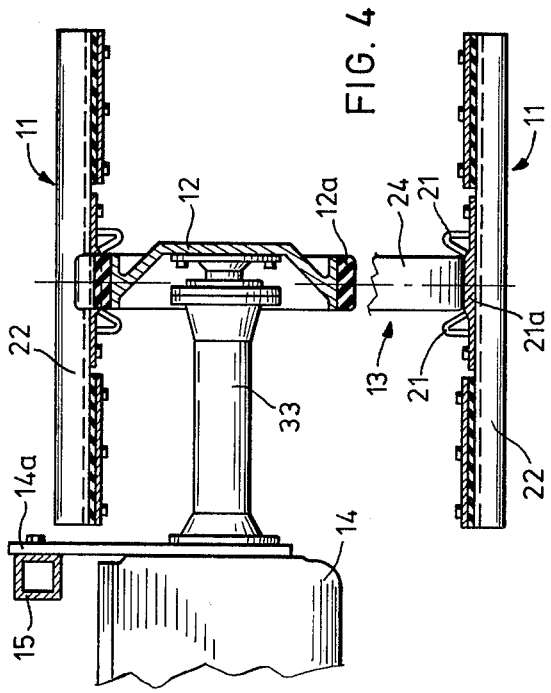

CONVERTIBLE CHASSIS FOR TRACK LAYING VEHICLES

BACKGROUND OF THE INVENTION

1. Field

The field of the invention is endless track laying vehicles and more particularly those having two or more endless belt, sprocket driven tracks.

2. State of the Art

Vehicles adapted to utilize endless tracks of fixed width are old in the art, as are the use of sprocket wheels and wheel bogie assemblies to power, support and guide the endless tracks. However, these state of the art vehicles have not been adapted to readily utilize tracks of more than a single width, as is often desireable, especially for snow-packing uses of the vehicles. A wide track vehicle is sometimes not suitable for space limited, obstruction containing areas requiring compaction. The wide tracks often do not provide sufficiently concentrated packing force. Conversely, a vehicle limited to narrow tracks in some instances requires more passes than should be necessary to compact larger areas. Theretofore, snow-packing vehicle operators have been forced to acquire the use of both narrow tracked and wide tracked vehicles. Changing vehicles to accommodate a differing track width has heretofore required extensive and expensive alterations of the vehicle chassis to lengthen or shorten wheel bogie and sprocket wheel axles, and changing the vehicle back again has been just as costly and time consuming. On some occasions, wider or narrower tracks have been installed on existing vehicles without chassis alteration, by adapting tracks for non-symmetrical installation upon the sprockets and bogies. Such tracks do not, however, evenly pack the snow, since the force upon the snow beneath these unsymmetrically mounted tracks is not evenly distributed, the tracks tilting from the horizontal and leaving slanted impressions in the snow.

BRIEF SUMMARY OF THE INVENTION with the foregoing in mind, the present invention provides, in a track laying vehicle, the capability of using either a wide or narrow endless belt track. Track drive sprocket wheels of the invention carry sprocket drive shaft connecting provisions comprising flange means permitting the wheels to be reversibly mounted on the sprocket drive shafts. In accordance with one embodiment of this invention, each sprocket wheel may utilize a single flange member having each of its opposing faces adapted for mounting the sprocket upon its drive shaft. The belt driving sprocket is offset axially from the flange means, so that the sprocket may be installed closer to or farther away from the longitudinal centerline of the vehicle to accommodate either a narrow or a wide endless belt track upon the vehicle. Rigid cross members are provided secured to the frame of the vehicle, and track guide wheel bogie assemblies are provided carrying provisions for their mounting on the cross members in locations consistent with selected sprocket installations.

In accordance with one embodiment of the invention, the bogie mounting provisions may comprise "U"-bolts and associated plates securing the centers of two parallel leaf springs of the bogie assembly to the cross member, a bogie wheel being secured rotatably between the springs at each of their paired ends. Accordingly, it is the principal object of the invention to provide the capability for use of either wide or narrow tracks in a single tracked vehicle, so that one vehicle may be utilized where two might otherwise be required, and to do so economically.

BRIEF DESCRIPTION OF THE DRAWINGS

FIG. 2 is a perspective representation of a wheel bogie assembly mounted up a cross member, partially shown, in accordance with the invention.

FIG. 3 is a detailed longitudinal centerline sectional representation of a reversible sprocket wheel, shown in conjunction with its driving shaft.

FIG. 4 is a partial sectional, schematic representation of a track laying vehicle indicating a sprocket wheel and wheel bogie assembly disposed to accommodate a narrow endless belt track upon the vehicle.

FIG. 5 is a partial, sectional, schematic representation of track layingvehicle with a sprocket wheel and wheel bogie assembly disposed to accommodate a wide endless belt track upon the vehicle.

DETAILED DESCRIPTION OF ILLUSTRATED EMBODIMENTS

Figure 1:
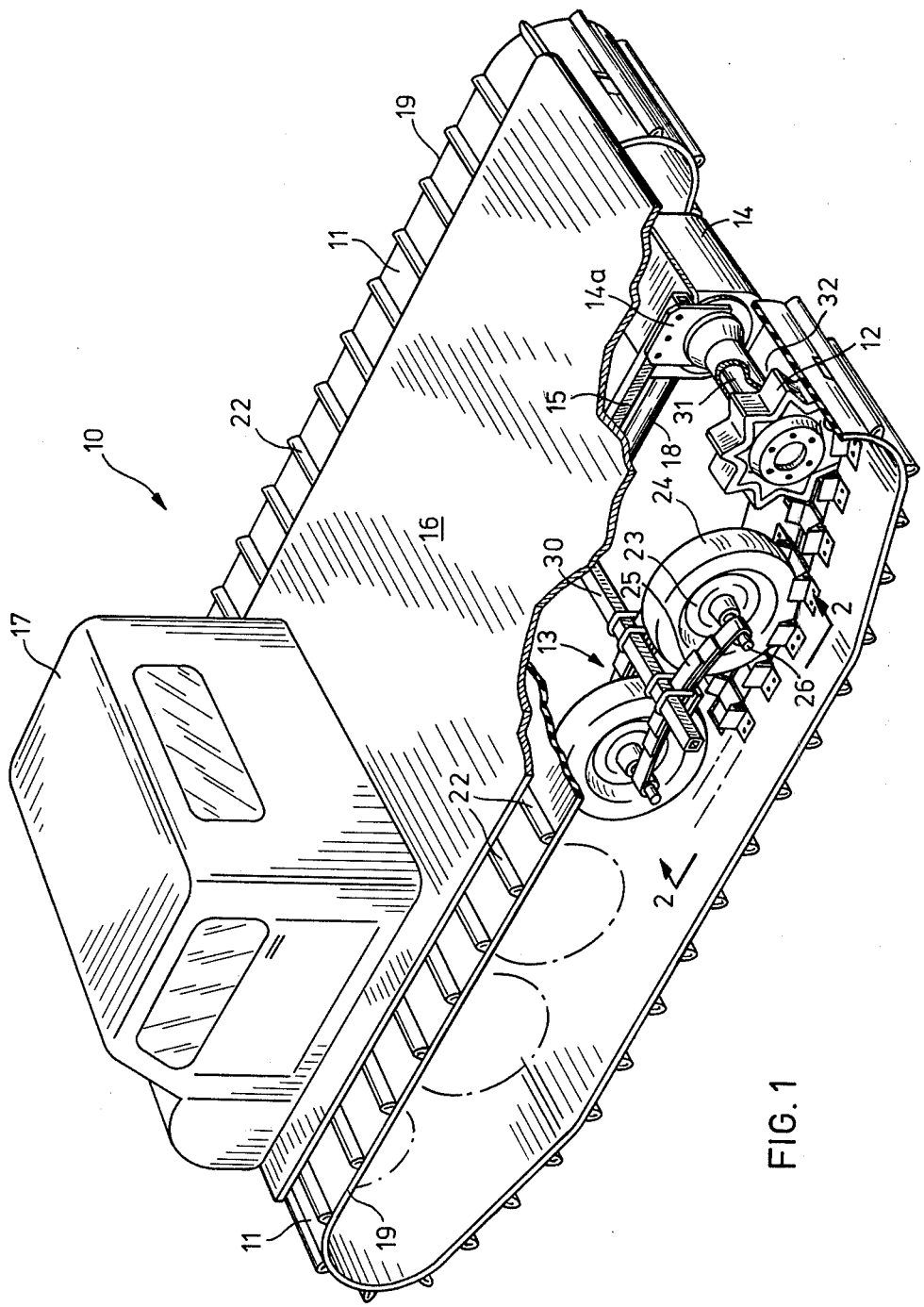
FIG. 1 is a perspective, partially cut away representation of a track laying vehicle, showing reversible sprocket and selectably mounted bogie wheel assemblies in accordance with the invention.

A track laying vehicle, for use on snow or earth and generally designated 10, is shown in FIG. 1, comprising endless crawler tracks 11, track driving sprockets 12, track guide wheel bogie assemblies 13, a power differential 14, a vehicle frame 15, and a deck 16 upon which is mounted a passenger cab 17. Engine drive shaft assembly 18 transmits power from a vehicle engine, not shown, to differential 14, which in turn powers track drive sprockets 12, which engage endless crawler tracks 11 to propel vehicle 10, with track cleats 22 on belts 19 gripping the snow. (FIG. 5) Sprocket gear teeth 12a engage crawler track 11 through wheel guide plates 21a, each secured to a cleat 22. The cleats 22 are uniformly spaced along belt 19, a distance apart compatible with the spacing of gear teeth 12a about the circumference of sprocket 12, so that each cleat 22 engaged in turn by a sprocket gear tooth 12a.

Wheel bogie assemblies 13 support and guide tracks 11 by contact with wheel guides 21, secured to cleats 22 and inwardly to belts 19. (FIG. 5) Bogie assemblies 13 comprise two wheels 23 carrying tires 24, each wheel 23 being supported upon a leaf spring 25 through a wheel axle 26 (FIG. 2). "U"-bolts 27 and toggle plates 28 serve to secure wheel bogie assemblies to a horizontal cross-member 30 secured to frame 15. Note that bogie assembly 13 may, in accordance with the invention, be secured at selectable locations along horizontal frame cross member 30, closer to or farther from the center of vehicle 10. Therefore tracks 11 of various selectable widths may be accommodated upon vehicle 10 by bogie assemblies 13.

Drive sprocket wheel 12 is adapted to accommodate either a narrow or a wide crawler track 11 upon vehicle 10, as now described. (FIG. 1 and 3) Sprocket wheel 12 is driven by sprocket power shaft 31, which is powered by the vehicle engine by way of main drive shaft 18 and differential 14. Sprocket drive shaft 31 carries sprocket wheel mounting flange 32 at its end distal from differential 14. Shaft 31 is installed within a stationary support shell assembly 33 by shaft bearings, not shown, in a bearing housing 34 in the vicinity of flange 32. Shell 33 is rigidly secured to the housing of differential 14, as indicated in FIG. 1.

Sprocket 12 carries a shaft mounting flange 35 having identical opposing faces 36 and 37, flange 32 being adapted to be attached to either face by bolts 38. Center-plane 39 of sprocket wheel 12 is displaced from a parallel flange center-plane 40 a distance 41. By attachment of shaft flange 32 to face 37, sprocket wheel 12 is reversed as indicated by dashed lines in FIG. 3, and thereby disposed closer to differential 14 by a distance 41a of twice distance 41. In this manner, sprocket 12 is converted to accommodate a wider or narrower endless crawler track 11 on vehicle 10. FIG. 4 shows sprocket 12 attached to accommodate a narrower crawler track 11, on vehicle 10. FIG. 5 illustrates sprocket 12 reversed to accommodate a wide crawler track 11. Crawler track 11 is centered upon sprocket wheel 12 and wheel bogie assemblies 13, and its maximum width is such as to avoid interference with engine or drive components of vehicle 10 downhanging from frame 15, such as differential mounting plate 14a seen in FIG. 5.

The invention may be embodied utilizing other components and devices than those described and illustrated herein, without departing from the essential spirit of the invention. The embodiments illustrated and described herein are for illustrative purposes only, the invention being limited only by the length and breadth of the appended claims, and all embodiments within said length and breadth, and all equivalents thereof, are intended to be embraced therein.

I claim:

1. In a track laying vehicle, comprising a vehicle frame; a vehicle power transmission differential assembly carried by the frame; and two sprocket drive shaft assemblies on a common longitudinal axis, each extending transversely to the vehicle from the differential assembly, and each having at its distal end a sprocket wheel attachment flange;

the improvement comprising:
at least one elongated rigid cross-member secured to the frame and carrying an extension transverse to the vehicle beyond each side of the frame;
two wheel bogie assemblies for engaging and guiding and an endless belt track, each adapted to be secured to one of the extensions of the cross-member at selectable locations thereon; and
two endless belt drive sprocket wheels, each having a periphery adapted to engage and drive an endless belt track and each having sprocket flange means for mounting of the sprocket wheel reversibly upon one of the sprocket wheel attachment flanges, said sprocket flange means being disposed a substantial distance from the plane normal and central to the track engaging periphery, so that said periphery may be selectably disposed closer to or farther from the longitudinal centerline of the vehicle.

2. The improvement of claim 1, wherein the periphery of each sprocket wheel comrises a toothed cylindrical rim portion adapted to serially engage cleats of an endless belt, cleat carrying track and each sprocket wheel further comprises:
a generally conical portion extending inwardly from the rim portion and contiguous therewith;
a generally circular plate flange portion internal to the conical portion and contiguous with the innermost extension thereof, the flange portion having opposite faces each concentric with the rim portion and perpendicular to the axis thereof, both of the faces offset in a common direction from the plane central and normal to the rim portion, the flange portion being adapted to permit securement of the sprocket wheel to one of the sprocket wheel attachment flanges selectably with one or the other of the opposite faces in contact therewith.

3. The improvement of claim 1, wherein the wheel bogie assemblies each comprises:
two upwardly convex leaf spring assemblies disposed in parallel arrangement side by side;
two axles, each connecting an end of one leaf spring assembly with a corresponding end of the other leaf spring assembly;
two identical tired wheels, each carried rotatably between the leaf spring assemblies upon one of the axles; and
means for securing each leaf spring assembly generally at its lonitudinal center to one of the extensions of the rigid cross-member perpendicularly thereto and selectably therealong.

4. The improvement of claim 3, wherein the means for securing each leaf spring assembly to the cross-member extension comprises:
a "U"-bolt plate, secured centrally to the leaf spring assembly with an extension laterally beyond both sides thereof and having a pair of spaced apart "U"-bolt holes perpendicularly through each plate extension and aligned generally parallel to said sides; and
two "U"-bolts each with associated locking nuts and washers, each "U"-bolt being configured for installation around the cross-member extension and through one of the pairs of holes.

* * * * *